United States Patent Office 2,877,337
Patented Mar. 10, 1959

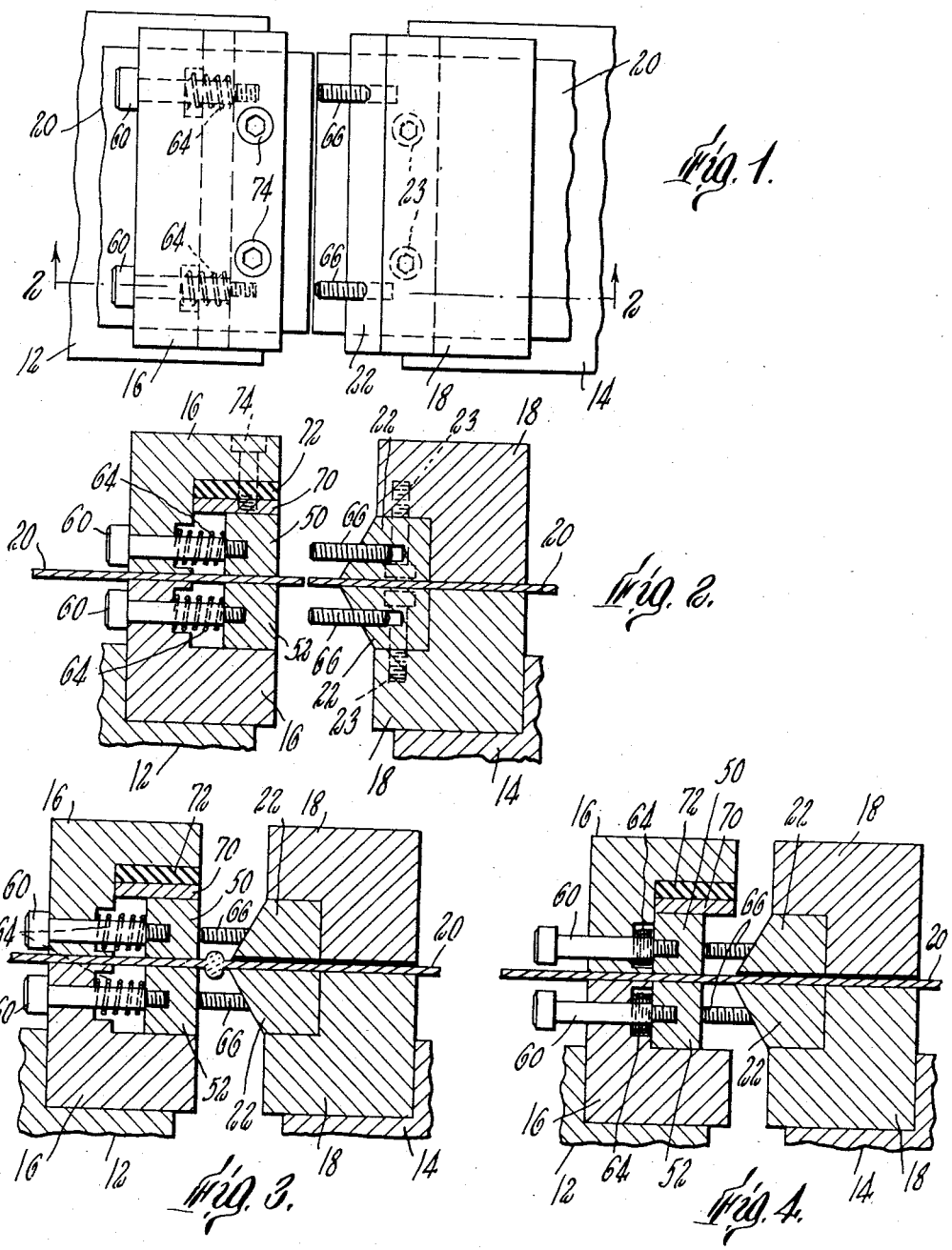

2,877,337

WELDING MACHINE

Arthur N. Evans, Bethel, Conn., assignor to Thomson Electric Welder Company, Lynn, Mass., a corporation of Massachusetts Application October 11, 1957, Serial No. 689,545

7 Claims. (Cl. 219—97)

This invention relates to flash-butt welding machines and more particularly to flash-butt welding machines which incorporate means for removing automatically, as a function of the machine cycle, the flash or upset metal produced by a welding operation.

In the flash-butt welding process, an electric arc is first drawn between adjacent surfaces of the workpieces clamped in the welding machine to heat said surfaces and thereafter the workpieces are moved together with substantial force to weld the workpieces together. The force with which the adjacent surfaces of the workpieces are driven together is substantial in magnitude and it is necessary particularly with thin sheet metal workpieces adequately to support them in the area adjacent the surfaces to be welded to insure proper alignment of the surfaces as they are driven together and to prevent buckling or other distortion. Thus it is desirable that the workpieces be supported as near as possible to the edges to be welded. The location of the support, however, is dependent in part on the amount of metal which is displaced outwardly from the area of the weld when the workpieces are driven together, which metal, generally called "flash" or "upset" metal, forms a raised surface in the vicinity of the weld and must subsequently be removed.

As described in U. S. patent application Serial No. 665,881, filed June 14, 1957, in certain machines of the flash-butt type the upset metal is removed by providing a cutting or shearing member on the welding machine itself, preferably as a portion of the platen structure, which operates to remove the upset metal from the weld area as a part of the machine cycle. However, in machines incorporating such a shearing member, there must be provided sufficient space between the upset and the clamping structure so that the upset metal may be removed by the shearing member without damaging or otherwise interfering with the clamping structure, and this has heretofore limited such machines to use for welding of relatively thick workpieces since adequate support could not be achieved when relatively thin sheet metal was welded and sheared.

Accordingly, it is a primary object of the present invention to provide, in a welding machine incorporating an upset removing cycle as a successive operation to the welding cycle, means adequately to support and align comparatively thin workpieces during the welding cycle.

Another object of the invention is to provide in such a welding machine means to provide adequate support for comparatively thin workpieces during the upset removing cycle.

The invention features a workpiece support structure positioned between the welding machine clamps and resiliently supporting the workpiece for movement therethrough. This novel support structure is particularly adaptable for the welding of comparatively thin sheet metal plates as the plate is supported closely adjacent the weld area during the welding operation and the support member is gradually advanced during the upset removing cycle preferably by the shearing clamp itself, such that there is no interference between the shearing clamp and the workpiece support means.

Conventional welding machines may readily be modified to take advantage of the invention and such welding machines are particularly well adapted to mass production methods and to automatic welding equipments.

Further objects and features of the invention will become apparent from the following description of a preferred embodiment of the invention, together with the accompanying drawings in which:

Fig. 1 is a plan view of the clamping, shearing and supporting structures of the preferred embodiment of the invention;

Fig. 2 is a side elevation along the lines 2—2 of Fig. 1 showing the position of the elements prior to the welding operation;

Fig. 3 is a sectional elevation similar to Fig. 2 showing the position of the elements after the welding operation and before the upset removing portion of the machine cycle;

Fig. 4 is a sectional elevation of the elements of Fig. 2 showing the position of the elements at the completion of the upset removing operation.

Figure 5:
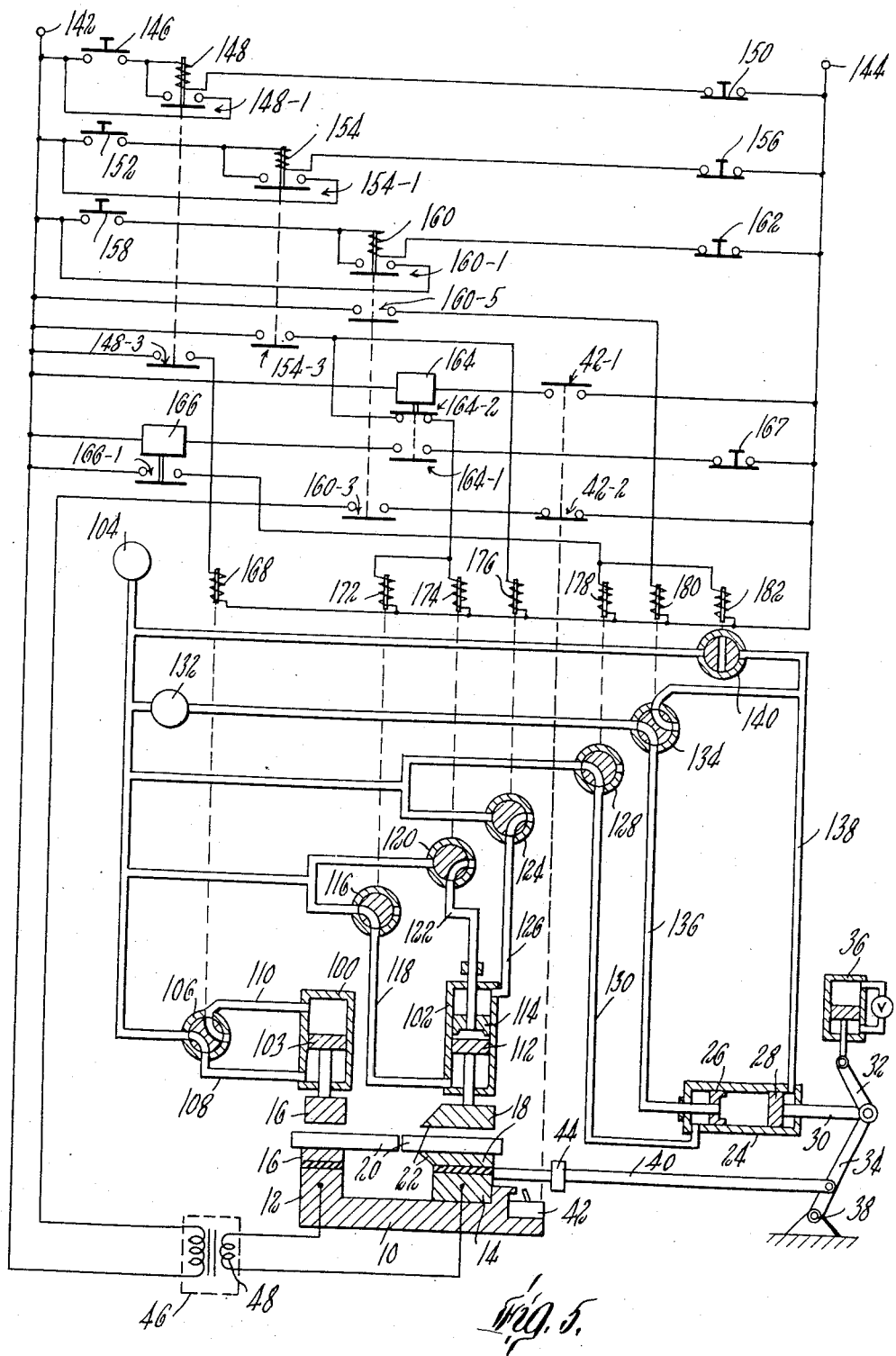
Fig. 5 is a diagrammatic view of a complete welding machine and its control system.

Referring to the drawings, the welding machine has a base 10 upon which are mounted an insulated fixed platen 12 and an insulated movable platen 14. Each of the platens 12, 14 has a clamping structure 16, 18, respectively, consisting of an upper jaw and a lower jaw, for clamping the pieces of work 20 to be welded. The jaws of clamping structure 18 include shearing portions 22 attached thereto by bolts 23 and having shearing edges which are adapted to remove upset metal from the area of the weld when opened a slight predetermined distance and advanced across the completed weld.

For operation thereof to control the clamps for welding followed by shear, the fixed clamp 16 has a single piston cylinder 100 associated therewith and the movable clamp 18 has a two-piston cylinder 102, best shown in Fig. 5 and hereinafter described.

The movable platen 14 is actuated by a hydraulic motor mechanism which is adapted to provide, (1) a controlled forward movement during the flash off, (2) a more rapid forward movement and a relatively quick push-up to bring the workpieces 20 together to produce the weld and simultaneously produce an upset of the adjacent edges of the pieces 20 and; (3) a subsequent advance across the weld area of the slightly opened clamping structure 18 with its shearing portions 22 to remove the upset. The mechanism includes a hydraulic cylinder 24 with two pistons 26, 28 therein, as shown in Fig. 5 and described hereinafter. The piston rod 30, attached to the piston 28, is connected to a toggle mechanism, consisting of two links 32, 34 at the pivot connection between links 32 and 34. The second end of link 32 is connected to a snubbing mechanism 36 and the second end of link 34 is connected to a fixed pivot point 38. The main operating rod 40 is attached to the link 34 at an intermediate point thereon and to the movable platen 14. A limit switch 42, mounted on the base 10, is operated by a trip device 44 mounted on the rod 40. Suitable welding current is supplied to the welding machine by a welding transformer 46 having one terminal of its secondary winding 48 connected to the fixed platen 12 and the other terminal connected to the movable platen 14.

According to the present invention, an auxiliary workpiece support structure is associated with platen 12. Said workpiece support structure comprises auxiliary jaws 50 and 52, one by each side of clamp 16, and positioned for sliding movement relatively thereto by means of guide bolts 60 each passing through a hole in clamp 16 and being threaded into the auxiliary jaws 50, 52. A spring 64 is interposed between each jaw 50, 52 and its clamp 16 on the shank of each bolt 60 to maintain it in engagement with cooperating spacing bolts 66 on shearing portions 22 upon advance of clamps 18 for shearing. The head of each bolt 60 in coaction with the face of its clamp 16 positions the auxiliary jaws 50, 52 relative to the other clamps 18 during the welding operation.

To provide resilient clamping pressure while allowing workpiece movement through the auxiliary jaws, as well as to carry the upper auxiliary jaw 50 on upper clamp 16, a plate 70 is positioned above the auxiliary clamping member 36 and a rubber pad 72, or other means of providing auxiliary pressure, is interposed between the plate 70 and the upper clamp 16. A bolt 74, passed through a hole in upper clamp 16, is threaded into plate 70 to maintain it in position. Said bolt 74 is also utilized to preset the compressive pressure on the rubber pad 72 such that jaws 50 provide adequate resilient clamping pressure to support the workpiece 20 in position and yet permit auxiliary jaws 50, 52 to be advanced relatively to the workpieces during the upset removing cycle, so that the welded workpieces in effect move therethrough. This construction permits the auxiliary jaws 50, 52 to slide within the clamps 16 and thereby provide a support for the workpiece 20 during the welding cycle, which support may be advanced from the area of the weld during the removal of the upset metal.

The spacing bolts 66 may be threaded into the shearing portions 22 for a predetermined distance and are adapted to provide a surface which contacts the auxiliary jaws 50, 52 in advance of the shearing edges of the portions and advances them away from the weld area at a predetermined distance from the shearing edges of portions 22 so that said shearing edges are able to remove the upset metal without interference or injury to them or the clamp structures. Thus, critical positioning tolerances or similar safeguards to prevent the knives from contacting the clamping structure are not required.

As for the complete welding machine including its control system as illustrated in its retracted, unclamped position in Fig. 5, and described in detail in said application Ser. No. 665,881, filed June 14, 1957, the fixed platen clamping cylinder 100 is divided by piston 103 into two chambers. The lower chamber is connected to a source of hydraulic pressure 104 through a solenoid-operated four-way valve 106 and line 108 and the upper chamber is connected to the atmosphere through the solenoid valve 106 and line 110. The movable platen clamping cylinder 102 is divided by pistons 102 and 104 into three chambers. The lower chamber is connected to source 104 through a solenoid-operated three-way valve 116 and line 118, the middle chamber connected to the atmosphere through three-way valve 120 and line 122, and the upper chamber is connected to the atmosphere through a solenoid-operated three-way valve 124 and line 126. The platen operating cylinder 24 is divided into three chambers by pistons 26 and 28. The left chamber is connected to the source 104 through a solenoid-operated three-way valve 128 and line 130, the intermediate chamber is connected to source 104 through regulator 132, a solenoid-operated four-way valve 134 and line 136, and the right chamber is connected to the atmosphere through valve 134 and line 138. Line 138, in addition, is connected to a solenoid-operated two-way valve 140.

The solenoids associated with these valves are connected in parallel across lines 142 and 144. Each solenoid is in series with one or more pairs of contacts of timing and/or control relays. All the electrical control circuitry for the welding machine is connected to a suitable source by lines 192 and 194.

In this description, the contacts associated with a relay coil are designated by the coil's reference number and an additional number to designate the set of contacts. An odd number is used for normally open contacts and an even number for normally closed contacts. For example, contacts 160–3 are a set of normally open contacts associated with coil 160.

The fixed platen clamping control circuit includes a normally open push button 146, a control relay coil 148 and a normally closed push button 150, in series across lines 142 and 144. Contacts 148–1 are in parallel with push button 146. The movable platen clamping control circuit includes a normally open push button 152, a control relay coil 154 and a normally closed push button 156, in series across lines 142 and 144. Contacts 154–1 are in parallel with push button 152. The platen advancing control circuit includes a normally open push button 158, a control relay 160 and a normally closed push button 162 in series across lines 142 and 144. Contacts 160–1 are in parallel with push button 158. The welding current control circuit includes the primary winding of transformer 46, contacts 160–3 and contacts 42–2 of the limit switch 42, in series across lines 142, 144. A first timing relay 164 is connected in series with contacts 42–1 of the limit switch and a second timing relay 166 is connected in series with contacts 164–1 and a normally closed push button 167.

The solenoids associated with the hydraulic valves are connected in parallel across lines 142, 144. Solenoid 168, operating valve 106, is connected in series with contacts 148–3. Solenoid 172, operating valve 116, is connected in series with contacts 154–3 and 164–2. Solenoid 174, operating valve 120, is connected in series with contacts 154–3 and 164–2. Solenoid 176, operating valve 124, is connected in series with contacts 154–3. Solenoid 178, operating valve 128, is connected in series with contacts 166–1. Solenoid 180, operating valve 144, is connected in series with contacts 160–5. Solenoid 182, operating valve 140, is connected in series with contacts 166–1.

The welding and shear-off cycle of the apparatus in this embodiment is diagrammatically illustrated in Figs. 2–4 and operates in the following manner. The workpieces 20 are placed in the platens 12, 14 with their adjacent edges to be welded separated a predetermined distance as shown in Figs. 1 and 2. The fixed platen clamping structure 16 is actuated by the depression of push button 146 which energizes relay coil 148 and closes contacts 148–1 (to complete the holding circuit across push button 146) and contact 148–3 energizing solenoid coil 168. The energization of coil 168 operates valve 106 to connect line 110 to hydraulic source 104 and line 108 to the atmosphere. The piston 103 is driven downward, actuating the clamping structure 16 to secure one of the workpieces 20 in the platen 12 and to resiliently clamp jaws 50, 52 thereon close to its edge to be welded. The movable platen clamping structure 18 is actuated by push button 152 which energizes relay 154, closing contacts 154–1 (to complete the holding circuit across push button 152) and contacts 154–3 energizing solenoid coils 172, 174 and 176. The energization of coil 172 operates valve 116 to connect line 118 to the atmosphere; the energization of coil 174 operates valve 120 to connect line 122 to the hydraulic source 104; and the energization of coil 176 operates valve 124 to connect line 126 to hydraulic source 104. The pistons 112, 114 are driven downward, actuating the clamping structure 18 to secure the second workpiece 20 in the platen 14. There is pressure in the intermediate chamber (between pistons 112 and 114) such that the pistons 112, 114 are spaced apart. The platen movement cycle is initiated by the depression of push button 158 which energizes coil 160, closing contacts 160–1 (to complete the holding circuit across push button 158) contacts 160–3 and contacts 160–5. The primary circuit of the welding current transformer 46 is completed by the closing of contacts 160–3 and the welding voltage is impressed on the output terminals of the transformer secondary 48. The advance of the movable platen 14 is initiated by the energization of solenoid coil 180 through the closing of contacts 160–5. The energization of coil 180 operates valve 134 to connect line 136 to the atmosphere and line 138 to the source 104 through the low pressure regulator 132. Piston 28 is driven to the left actuating the toggle mechanism and advancing the movable platen 14 through the links 32, 34 and rod 40. The movable platen 14 advances at a relatively slow rate as controlled by the snubbing mechanism 36 during the flash off. During this period an arc is initiated across the adjacent edges of the workpieces 20 to heat these surfaces in preparation for welding. After the toggle linkage passes dead center, the workpieces 20 are driven together at a more rapid rate to form a weld as the snubbing mechanism no longer impedes the movement of the toggle. The travel is arrested by the removable stop provided by piston 26 and thus the amount of the resulting upset is controlled by the position of piston 26, the workpieces 20 being supported closely adjacent said upset on one side of jaws 50, 52 and on the other side by clamp 18. The position of the clamps and driving mechanism at this time is as diagrammed in Fig. 3.

At some point during the flash off and upset welding cycle, the limit switch 42 is operated by the stop 44 to open contacts 42–2, deenergizing the primary of the transformer 46 to turn off the welding current, and to close contacts 42–1 to energize the time relay 164. After a short time delay of approximately 1–5 seconds to allow the temperature of the weld to be reduced, the relay 164 operates to close contacts 164–1 and to open contacts 164–2. The closing of contacts 164–1 energizes time relay 166 and the opening of contacts 164–2 deenergizes solenoid coil 172 and 174. The deenergization of coil 172 operates valve 116 to connect line 118 to source 104 and the deenergization of coil 174 operates valves 120 to connect line 122 to the atmosphere. Piston 112 is driven toward piston 114 which forms a removable stop, and at the same point or slightly later, studs 66 come into contact with auxiliary jaws 50, 52. This operation opens the clamping structure 18 a slight predetermined limited distance (approximately 0.010 inch) to permit movement of platen 14 relative to the welded workpieces while maintaining positioning support for the welded pieces. After an appropriate time delay, as determined by relay 166 to insure the opening of the clamping structure 18, the relay 166 operates to close contacts 166–1 energizing solenoid coils 178 and 182. The energization of coil 178 operates valve 128 to connect line 130 to the atmosphere and the energization of coil 182 operates valve 140 to connect line 138 to the source 104. This operation removes the stop provided by piston 26. Pistons 26 and 28 are then driven to the left and the toggle mechanism advances, driving the shearing portions 22 of the movable platen clamp structure 18 into and through the upset metal 135. As the platens move toward one another, studs 66 advance auxiliary jaws 50, 52 simultaneously therewith relatively to workpiece 20 and clamps 16, while said jaws resiliently support workpieces 20 adjacent their welded edges a predetermined distance from the edges of shearing portion 22 throughout the shearing advance of the shearing portion 22 across the welded workpiece edges. During this shearing action the welded pieces 20 of course remain secured in place by clamping structure 16. The excess metal surrounding the weld is thus quickly and easily removed in an automatic process as a portion of the machine cycle. The position of the clamping and platen driving mechanisms at this time is as shown in Fig. 4. After the shearing operation has been completed the time delay relay 166 may be deenergized by depressing push button 167 to open contacts 166–1 and deenergize solenoid coils 178 and 182. The deenergization of coil 172 operates valve 128 to connect line 130 to the source 104 and the deenergization of coil 182 operates valve 140 to disconnect line 138 from the high pressure source. Line 138 remains connected to the lower pressure source through valve 134.

The fixed clamping structure 16 carrying jaws 50, 52 is opened, at the same time allowing auxiliary jaws 50, 52 to be urged outwardly by springs 64, by the depression of push button 150 which deenergizes coil 148 and opens contacts 148–1 to interrupt the holding circuit and contacts 148–3 to deenergize solenoid coil 168. The deenergization of coil 168 operates valve 106 to connect line 110 to the atmosphere and line 108 to the hydraulic source 54. Piston 103 is driven upward, moving the upper clamp 16 upward with upper auxiliary jaw 50. The movable clamp is completely opened by the depression of push button 156 which deenergizes coil 154, opening contacts 154–1 to interrupt the holding circuit and contacts 154–3 to deenergize solenoid coil 176. The deenergization of coil 176 operates valve 124 to connect line 126 to the atmosphere. The pistons 112, 114 are driven upward, opening the clamping structure 18 with their shearing portions 22. The movable platen 14 is retracted by the depression of push button 162 which deenergizes coil 160, opening contacts 160–1 to interrupt the holding circuit, contacts 160–3 (in the primary of transformer 46) and contacts 160–5, deenergizing solenoid coil 180. The deenergization of coil 180 operates valve 134 to connect line 136 to the source 104 through the low pressure regulator 132 and line 138 to the atmosphere. Piston 28 is driven to the right driving the toggle mechanism back across dead center and resetting the platen 14.

The welding machine is thus reset to the position shown in Fig. 1 ready to commence another welding and shear cycle.

During the above described operation, the auxiliary workpiece support jaws 50, 52 provide support closely adjacent one side of the welded edges of workpieces 20 and the shearing portions 22 of clamps 18 provide support adjacent the other side of the welded edge of workpieces 20, as is essential in welding thin sheet metal. For example, in welding .025 inch thick steel stock, the spacing between the members supporting the workpieces on either side of the weld is preferably less than .040 inch. Such close spacing, however, as a practical matter, leaves insufficient room to pass the shearing edges through the upset, unless both supports be moved as in the present invention. Thus, the support of the present invention is provided without the need for complex control systems to prevent damage to the clamping structure or to the shearing edges by contact with one another, and yet permits the welding of extremely thin steel stock by permitting the utilization of small die openings which provide adequate alignment and support of the workpieces.

The principles of the invention have been described in relation to the preferred embodiment of a flash-butt welding machine clamping structure. It is understood that while there has been shown and described herein a preferred embodiment, the invention is not intended to be limited thereby and modifications may be made therein within the spirit and scope of the invention as set forth in the appended claims.

I claim:

1. A flash-butt welding machine for butt welding opposed edges of relatively thin workpieces comprising a pair of relatively movable platens, each having a current carrying clamp for holding a workpiece to be welded, said clamps each being movable between a closed position for clamping such workpieces and an open position for removal of such workpieces, with one of said clamps having shearing edge portions, auxiliary workpiece support means slidably supporting, adjacent its edge to be welded, the one of said workpieces clamped by the other of said clamps, said auxiliary support means including a pair of auxiliary jaws mounted adjacent said other clamp for sliding movement in a direction along the opposed surfaces of a workpiece clamped in said other clamp, means for advancing said platens relatively toward one another to weld said workpieces and to open said one clamp while maintaining clamping pressure on said other clamp during further advance of said platens to shear upset metal from the welded edges of said workpieces, said workpiece support means advancing with said one clamp relatively to the welded workpieces and said other clamp while supporting such workpieces adjacent their welded edges upon advance of said one clamp across said edges.

2. A flash-butt welding machine as claimed in claim 1 wherein said one clamp includes means engaging said workpiece support means to advance it therewith while maintaining the shearing edge portion of said clamp spaced from said supporting means.

3. A flash-butt welding machine as claimed in claim 2 wherein said auxiliary jaws are maintained in resilient supporting contact with said workpiece.

4. A flash-butt welding machine as claimed in claim 3 wherein said auxiliary jaws are carried in said other clamp for sliding movement relatively thereto, and wherein said auxiliary support means further includes spring means interposed between said jaws and said other clamp for normally urging said auxiliary jaws into contact with said engaging means on said one clamp to maintain said workpiece support means and said one clamp spaced a predetermined distance from one another during advance thereof.

5. A flash-butt welding machine for butt welding opposed edges of relatively thin flat sheet metal workpieces comprising a pair of relatively movable platens, each having a current carrying clamp for holding a workpiece to be welded, said clamps each being movable between a closed position for clamping said work and an open position for removal of said work, and one of said clamps having shearing edge portions and an intermediate position in which it is opened a predetermined limited distance from said workpiece for shearing upset metal from a weld thereon, auxiliary workpiece support means slidably supporting adjacent its edge to be welded, the one of said workpieces clamped by the other of said clamps, said auxiliary support means including a pair of auxiliary jaws mounted on said other clamp for sliding movement in a direction along the opposed flat surfaces of a sheet metal workpiece clamped by said other clamp and means interposed between said other clamp and each of said auxiliary jaws for resiliently urging said auxiliary jaws together to slidably support said workpiece therebetween, motor means for advancing said platens relatively toward one another to weld said workpieces, and control means operable upon advance of said platens upon completion of the welding of the opposed edges of said workpieces to open said one clamp to said intermediate position while maintaining clamping pressure on the other clamp during further advance of said platens to shear upset metal from the welded edges of said workpieces, said workpiece support means progressively advancing with said one clamp relatively to the welded workpieces and said other clamp while supporting said welded workpieces adjacent their welded edges upon advance of said one clamp across said edges.

6. A workpiece supporting current carrying clamp for flash-butt welding machines for butt welding opposed edges of relatively thin flat sheet metal workpieces comprising a current carrying clamp having opposed main jaws for immovably clamping a workpiece to be welded and auxiliary workpiece support means slidably supporting an end of a workpiece clamped in said main jaws, said auxiliary support means including a pair of auxiliary jaws mounted for sliding movement in a direction along the opposed flat surfaces of a sheet metal workpiece clamped in said main jaws to slidably support a workpiece therebetween.

7. A workpiece supporting current carrying clamp for flash-butt welding machines for butt welding opposed edges of relatively thin flat sheet metal workpieces comprising a current carrying clamp having opposed main jaws for immovably clamping a workpiece to be welded and auxiliary workpiece support means slidably supporting an end of a workpiece clamped in said main jaws, said auxiliary support means including a pair of auxiliary jaws mounted on said clamp for sliding movement in a direction along the opposed flat surfaces of a sheet metal workpiece clamped in said main jaws, means interposed between each of said auxiliary jaws and said clamp for resiliently urging said auxiliary jaws together to slidably support a workpiece therebetween and spring means for normally urging said auxiliary jaws away from said main jaws in a direction along said workpiece.

References Cited in the file of this patent

UNITED STATES PATENTS

| 2,124,849 | Drain | July 26, 1938 |
| 2,272,737 | Chapman | Feb. 10, 1942 |
| 2,787,698 | Schlatter et al. | Apr. 2, 1957 |

FOREIGN PATENTS

| 456,326 | Great Britain | Nov. 6, 1936 |